(12) United States Patent
Basile, II

(10) Patent No.: US 6,257,974 B1
(45) Date of Patent: Jul. 10, 2001

(54) HOOK FOR SAUSAGE CONVEYOR

(75) Inventor: Vincent L. Basile, II, West Des Moines, IA (US)

(73) Assignee: Townsend Engineering Company, Des Moines, IA (US)

(*) Notice: Subject to any disclaimer, the term of this patent is extended or adjusted under 35 U.S.C. 154(b) by 0 days.

(21) Appl. No.: 09/573,917

(22) Filed: May 18, 2000

(51) Int. Cl.⁷ ................................................. A22C 15/00
(52) U.S. Cl. ............................................. 452/51; 452/177
(58) Field of Search ............................. 452/51, 177, 183, 452/186

(56) References Cited

U.S. PATENT DOCUMENTS

| | | |
|---|---|---|
| D. 397,287 | 8/1998 | Hergott et al. . |
| 3,115,668 | 12/1963 | Townsend . |
| 3,191,222 | 6/1965 | Townsend . |
| 3,312,442 | 4/1967 | Moeller . |
| 3,347,504 | 10/1967 | Goss . |
| 3,423,058 | 1/1969 | Kuster . |
| 3,972,499 | 8/1976 | Simmons . |
| 4,761,854 * | 8/1988 | Schnell et al. .................. 452/51 |
| 5,163,854 * | 11/1992 | Burger et al. .................. 452/51 |
| 5,183,433 * | 2/1993 | Townsend et al. ............. 452/51 |
| 5,354,229 * | 10/1994 | Markwardt et al. ............ 452/51 |
| 5,730,649 * | 3/1998 | Schliesser et al. ............. 452/51 |

* cited by examiner

Primary Examiner—Willis Little
(74) Attorney, Agent, or Firm—Zarley, McKee, Thomte Voorhees & Sease

(57) ABSTRACT

A sausage conveyor hook has an elongated flat support arm having first and second ends and first and second arm portions disposed at an angle with respect to each other. The first arm portion normally is disposed in a horizontal position on the conveyor, and the second arm portion extends downwardly and outwardly from the first arm portion. The support arm extends outwardly from the conveyor chain at a right angle. The support arm is of a flat construction and has forwardly and rearwardly side edges. A head is located on a lower end of the second arm portion and has a blade with an upper support edge extending upwardly and forwardly from the lower end of the second arm portion. An elongated tang element is on the head and has a link engaging portion located rearwardly and below the support edge. When a strand of linked sausages comprised of a plurality of sausage links separated by link points is draped over the support edge, the strand will bend on the pivotal link point proximate the support edge. The sausage links adjacent the bent link point will be held in an angular position with respect to each other by the relative positions and shapes of the blade and the tang. The support edge of the blade and the tang are such that the center axes of adjacent sausage links draped across the support edge will be in substantially the same vertical plane, and will dwell in a plane that is diagonally disposed with respect to the forward edge of the support arm.

10 Claims, 7 Drawing Sheets

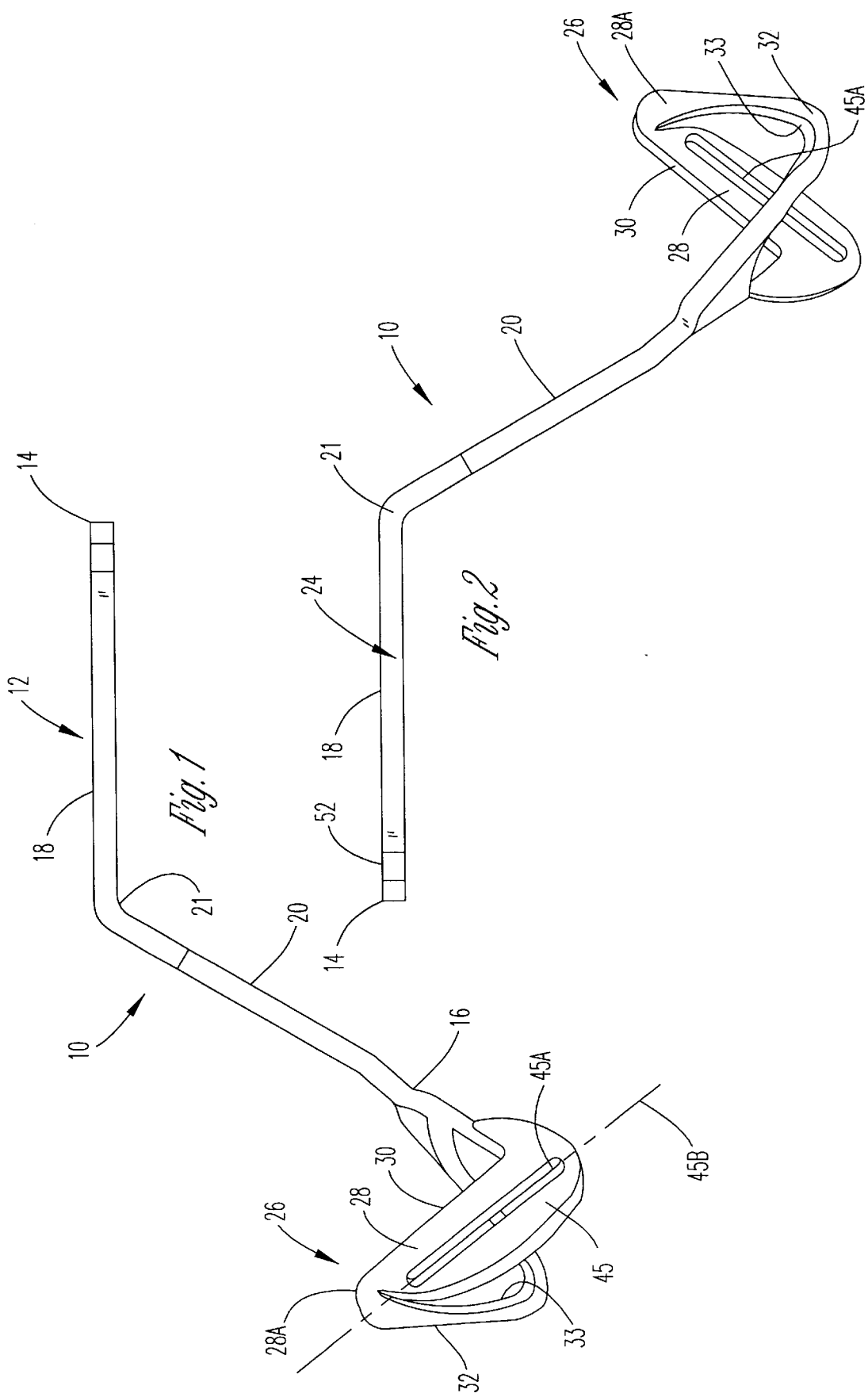

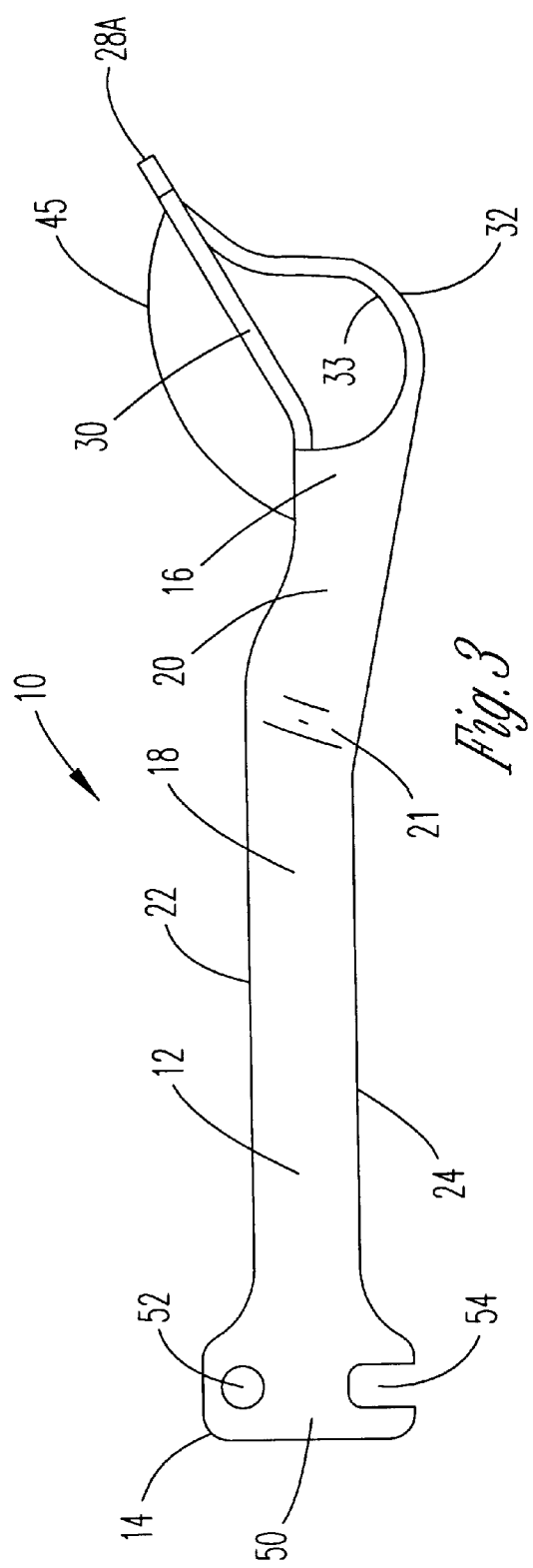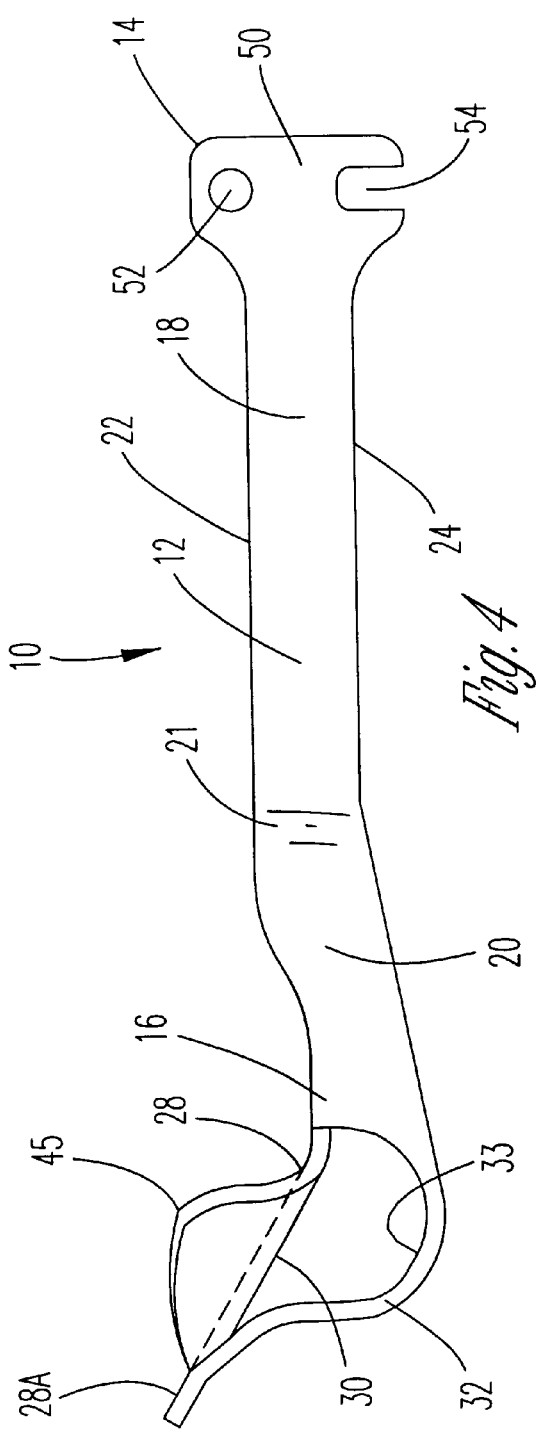

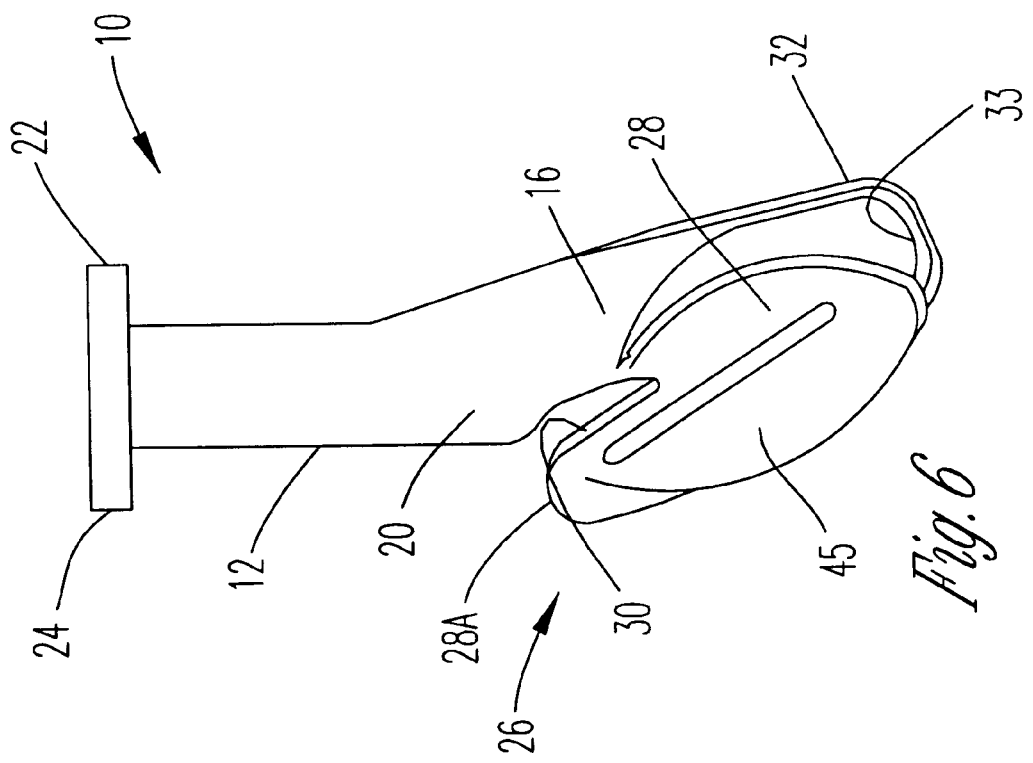
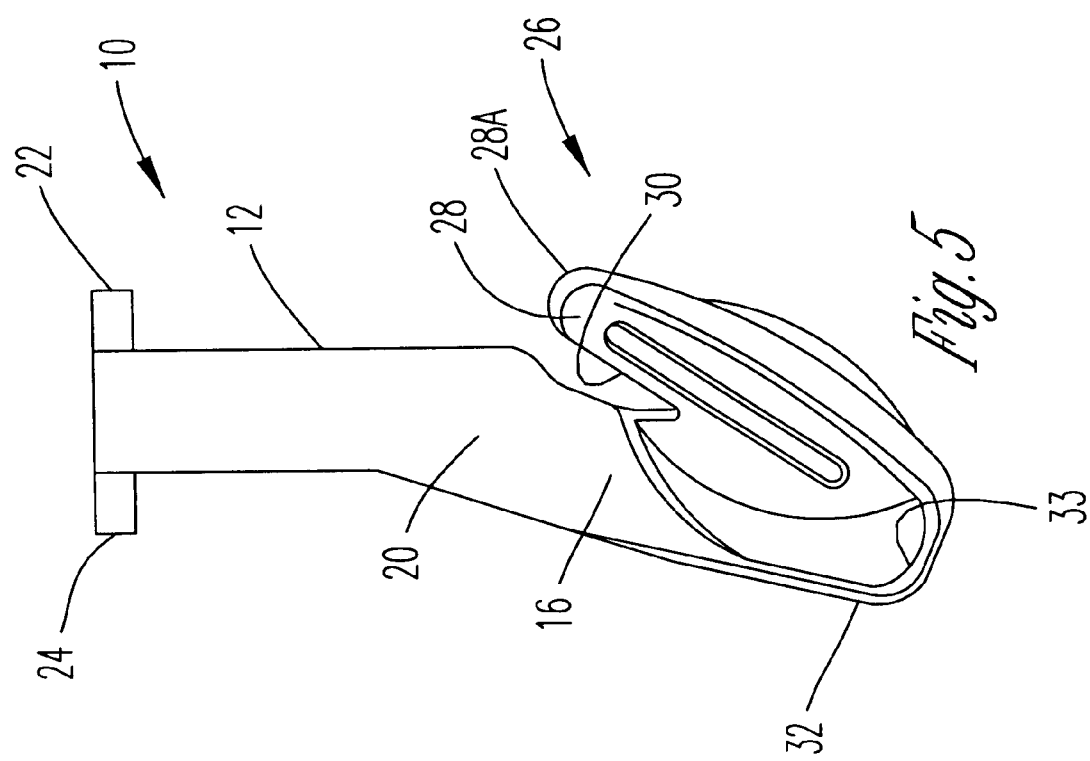

HOOK FOR SAUSAGE CONVEYOR

BACKGROUND OF THE INVENTION

Sausage making machines of the type long known in the industry (U.S. Pat. Nos. 3,191,222 and 3,115,668) are often accompanied by a conveyor which holds the strand of linked sausages in circular loops, each supported by a hook on the conveyor. The loops are then manually removed from the conveyor by use of an elongated "stick" wherein the stick is inserted through a plurality of loops, and then lifted from the hooks which support the loops. This is a difficult job which requires threading the stick through the loops of sausages which often are swinging on the hook. Removing the strands from the conveyor after they have been threaded onto the stick is also difficult, because the shape of the hooks does not easily release the loops, and because the hooks do not hold the loops in an open configuration.

The sticks, when filled with the loops of sausages, are then manually loaded onto a carrier or robotically loaded into a cooking or smoking device.

In addition, conventional wire hooks on sausage conveyors do not allow for the operator to easily insert the stick because the loop opening faces the operator of the sausage making machine, and the stick must be inserted from an opposite and more difficult direction. Further, much valuable time is consumed by removing a strand of linked material with the stick by conventional methods, and this slows down the overall progress of the sausage making machine. In the case of cellulose casings, they often become entangled upon being placed upon the conventional conveyors. They become twisted, and the loops form a figure eight shape which is not conducive to removal by the sticks.

It is therefore a principal object of this invention to provide a sausage conveyor hook which will spread the sausage links apart at the top of the loop to allow the person who is using the stick to remove the loop from the hooks by sliding it easily through the loops without having to slide the stick through loops of a tangled configuration.

A further object of the invention is to provide a sausage conveyor hook which will easily release the loops from the hooks by means of a passive trailing edge which will not snag the loops as they are lifted off the hooks.

A still further object of this invention is to provide a sausage conveyor hook which disposes the loops in a diagonal configuration with respect to the conveyor so as to permit the ease of insertion of a stick into the adjacent loops of sausages from a downstream direction.

A still further object of the invention is to provide a sausage conveyor hook which will allow the conveyor to drive the loops right upon the stick when the stick is held in a stationary position while the conveyor is moving the loops on to the stick.

A still further object of the invention is to provide a sausage conveyor hook that will easily accommodate cellulose casings as well as natural casings.

These and other objects will be apparent to those skilled in the art.

SUMMARY OF THE INVENTION

A sausage conveyor hook has an elongated flat support arm having first and second ends and first and second arm portions disposed at an angle with respect to each other. The first arm portion normally is disposed in a horizontal position on the conveyor, and the second arm portion extends downwardly and outwardly from the first arm portion. The support arm extends outwardly from the conveyor chain at a right angle. The support arm is of a flat construction and has forwardly and rearwardly side edges.

A head is located on a lower end of the second arm portion and has a blade with an upper support edge extending upwardly and forwardly from the lower end of the second arm portion. An elongated tang element is on the head and has a link engaging portion located rearwardly and below the support edge. When a strand of linked sausages comprised of a plurality of sausage links separated by link points is draped over the support edge, the strand will bend on the pivotal link point proximate the support edge. The sausage links adjacent the bent link point will be held in an angular position with respect to each other by the relative positions and shapes of the blade and the tang.

The support edge of the blade and the tang are such that the center axes of adjacent sausage links draped across the support edge will be in substantially the same vertical plane, and will dwell in a plane that is diagonally disposed with respect to the forward edge of the support arm.

BRIEF DESCRIPTION OF THE DRAWINGS

FIG. 1 is a forward elevational view of the conveyor hook of this invention;

FIG. 2 is a rearward elevational view thereof;

FIG. 3 is a top plan view thereof;

FIG. 4 is a bottom plan view thereof;

FIG. 5 is an outer side elevational view thereof as viewed from one side of the elongated conveyor chain or the other;

FIG. 6 is an inner side elevational view opposite to that of FIG. 5;

DESCRIPTION OF PREFERRED EMBODIMENT

Figure 7:
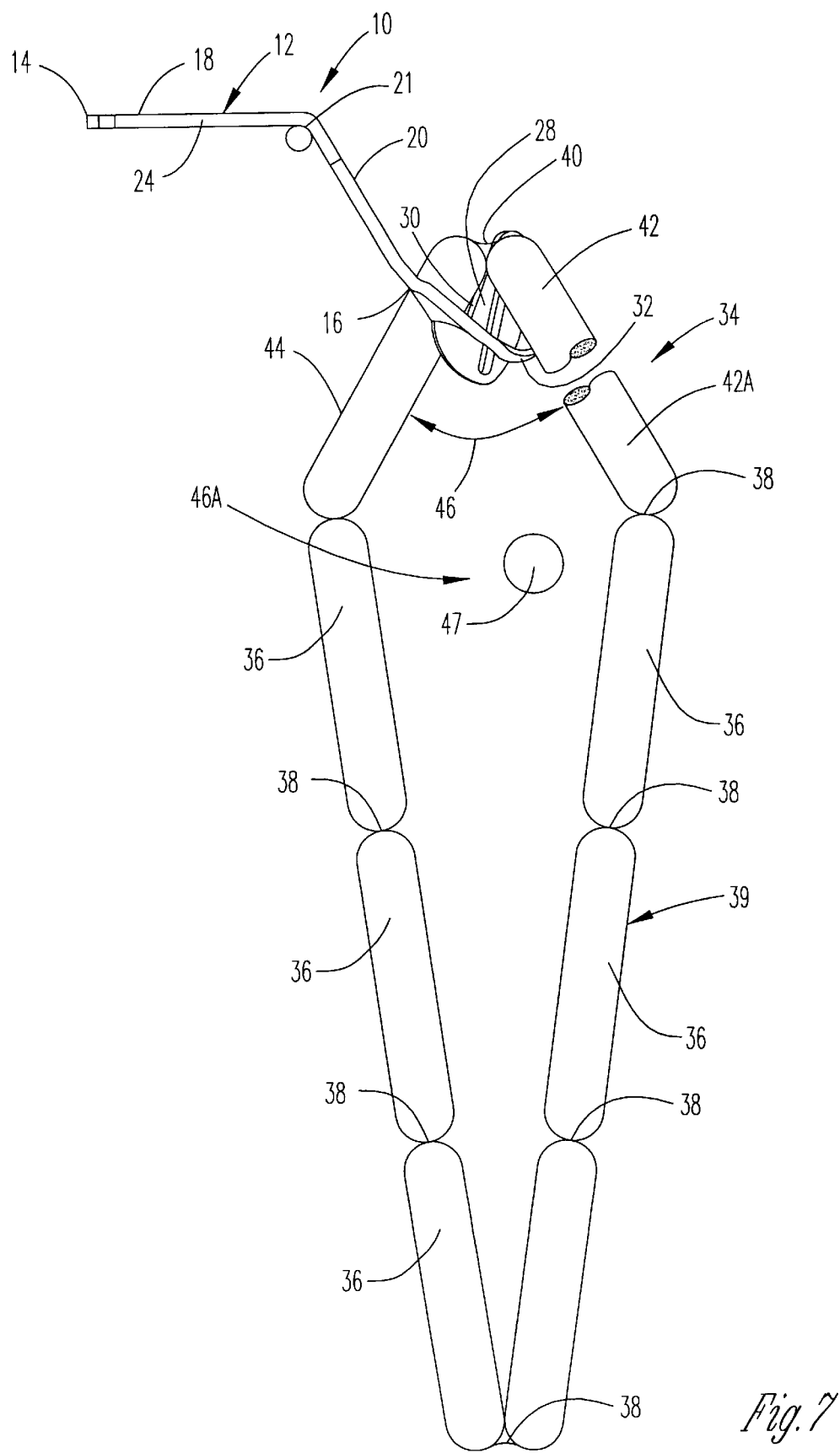
FIG. 7 is an enlarged scale elevational view of a loop of linked sausages supported on a conveyor hook as seen on line 7—7 of FIG. 9.
Figure 8:
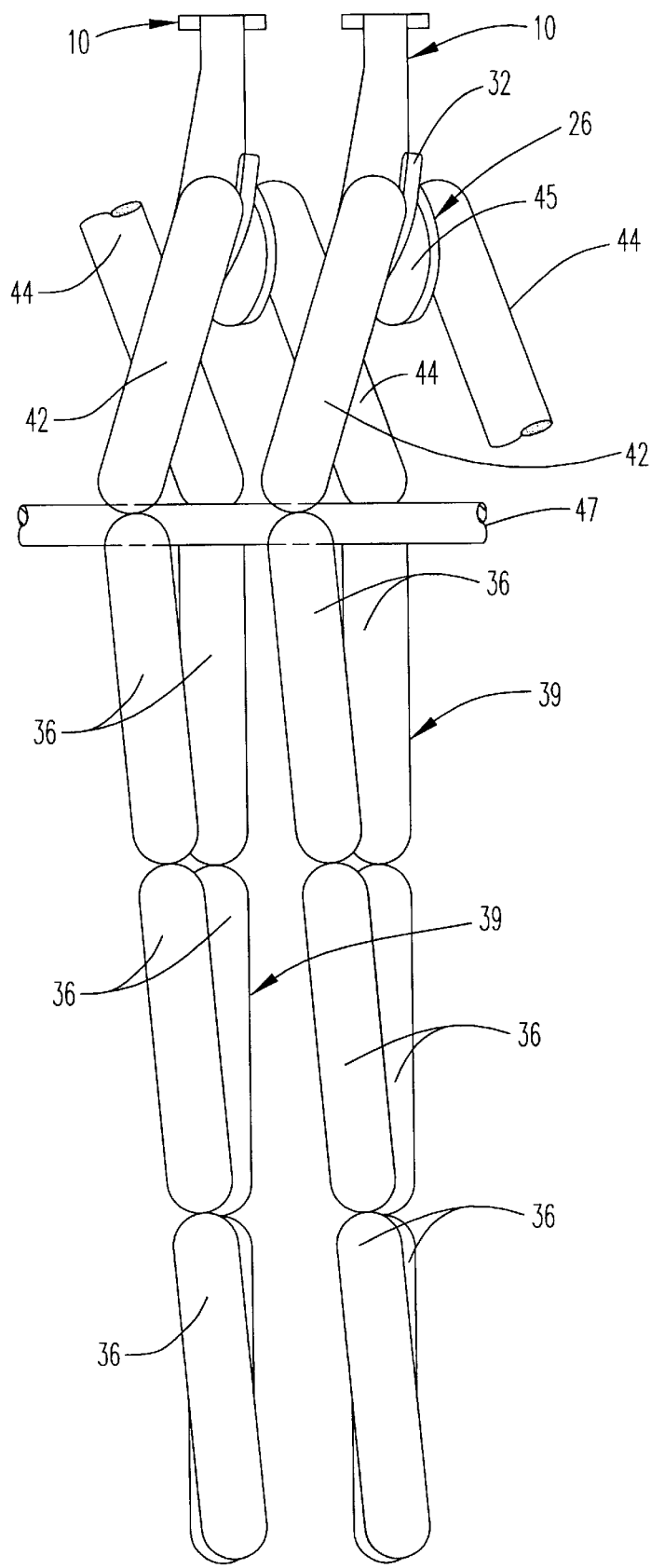
FIG. 8 is a partial side elevational view of hooks loaded with sausage loops.

With reference to FIGS. 1 through 6, the conveyor hook 10 has a support arm 12 which has a first end 14 and a second end 16. The support arm has a first arm portion 18 adjacent end 14 and a second arm portion 20 adjacent second end 16. The support arm is bent at 21 to dispose the first and second arm portions in an angular relation of approximately 45 degrees. As best shown in FIGS. 3 and 4, the support arm 12 has a substantially straight forward edge 22 and a substantially straight rearward edge 24. The support arm is preferably stamped from a sheet of metallic material approximately ⅛th of an inch thick and has a flat configuration and is not round in cross section as are most conventional hooks.

The second end portion 20 and the second end 16 terminate in a head 26 which has a blade 28 which extends upwardly and forwardly from the lower end 16 and the second arm portion 20. Normally, as will be discussed hereafter, the first arm portion 18 is disposed in a horizontal plane with the second arm portion 20 extending downwardly and outwardly therefrom. The blade 28 has an upper support edge 30 that extends upwardly and forwardly from the lower end of the second arm portion. An arcuate tang element 32 having a link engaging portion 33 extends from the second end 16 of the support arm 12 downwardly, and thence upwardly to be joined to the outer end 28A (FIG. 2) of the blade 28.

With reference to FIG. 7, a linked sausage strand 34 comprised of a plurality of links 36 joined at link points 38 forms a continuous loop 39. Loop 39 is comprised of a pivotal link point 40 at the top with adjacent rearward link 42 and forward adjacent link 44 on opposite sides thereof. The sausage strand 34 is draped over the upper support edge 30, and the adjacent links 42 and 44 extend downwardly from link point 40 and support edge 30 in rearward and forward directions respectively. (The numeral 42A in FIG. 7 is the rearwardly adjacent link of the next succeeding loop 39.) The rearward adjacent link 42 engages the link engaging portion 33 of tang element 32 so that it extends downwardly, outwardly and rearwardly from the supporting edge 30. Similarly, forward adjacent link 44 bends downwardly from its own weight from pivotal link point 40 and extends downwardly, inwardly and forwardly from the support edge 30. The link 44 is held in this position by its engagement with outwardly extending flange 45 (FIG. 3). The bending of flange 45 to its angular position with respect to blade 28 is facilitated by the formation of an elongated slot 45A which is located on the bend line 45B between the blade 28 and the flange 45 (FIG. 1).

It is seen that the conveyor hook of this invention is stamped out of a piece of flat plate material and is simultaneously or subsequently bent into the configurations of the various components as described above. The configuration of these components spreads the upper portions of the sausage loops 39 in the manner shown in FIG. 7 to facilitate the entry into the space 46A of the elongated stick 47. In addition, the configuration of the various components on the head 26 of the hook places the loops 39 in an open diagonal position with respect to the direction of travel of the conveyor chain and the hooks to again facilitate the entry of the stick 47 into the loops. As the stick 47 is elevated after being inserted into the loops 39, the pivotal link point 40 slides upwardly over and off of the supporting edge 30 to free the forward adjacent link 44 from the hook, while the passive support supplied by tang element 32 and link engaging portion 33 thereof provides no resistance to the lifting and removal of the loops from the hooks.

Figure 9:
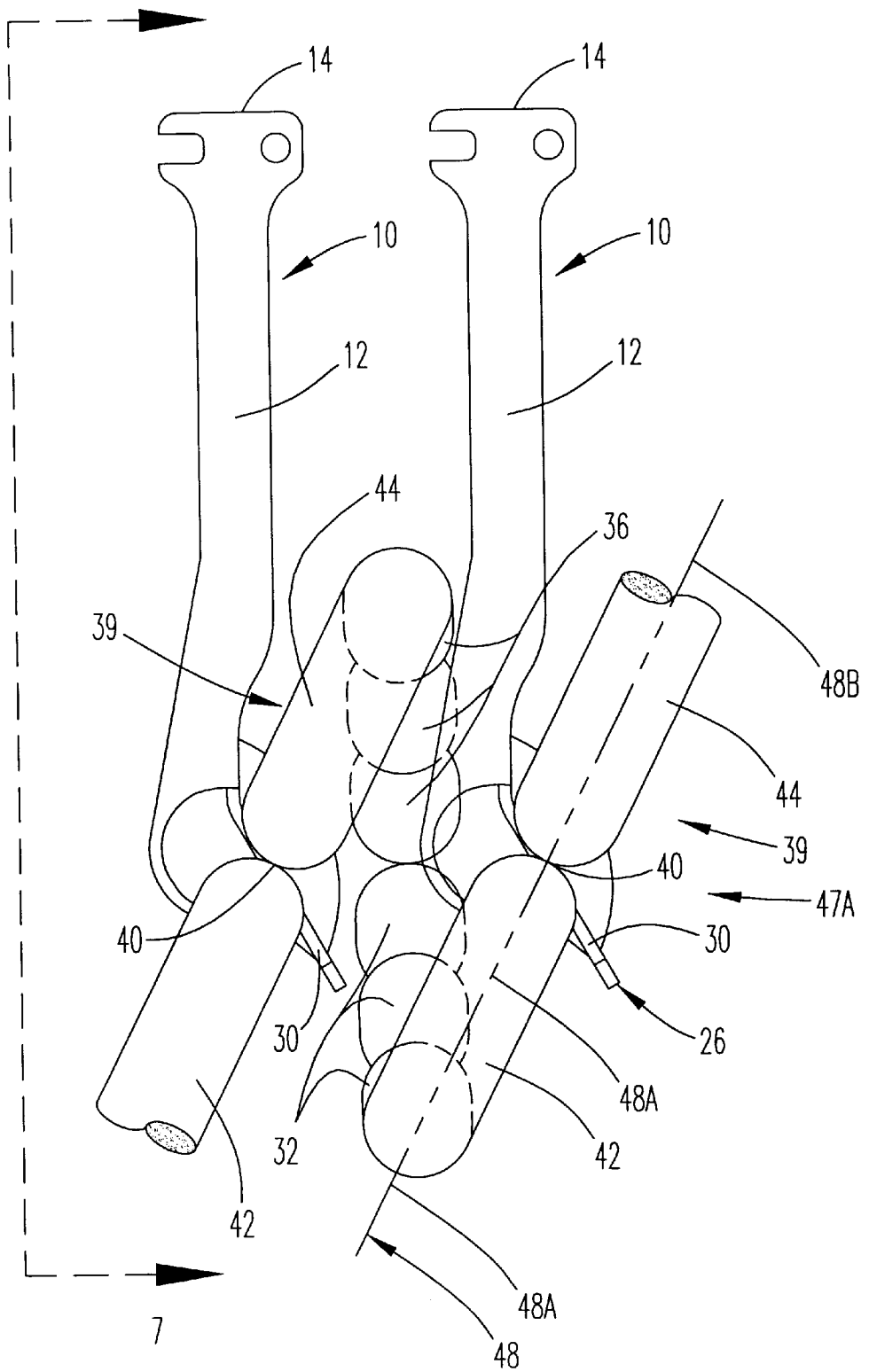
FIG. 9 is a partial plan view of the elements shown in FIG. 8.

The angle 46 between adjacent links 42 and 44 form an angle of approximately 45 degrees which creates the enlarged area of space 46A at the top of loop 39 (FIG. 7). This enlarged space 46A permits the easy insertion of the elongated stick 47 (FIG. 7) into that space. Further, with reference to FIG. 9, it should be noted that the loop 39 basically is contained in diagonal plane 48 which facilitates the insertion of the stick 47 in a longitudinal direction when pointed in a rearward direction along aligned loops 39. (See arrow 47A, FIG. 9.)

The stick 47 can be moved longitudinally in a rearward direction through spaces 46A, or can be held in a stationary longitudinal position whereby a conveyor, as will be described hereafter, while moving the loops 39 in a forwardly direction, can move on to the length of the stick 47.

Again with reference to FIG. 9, adjacent links 42 and 44 dwell in the diagonal plane 48 and therefore are in planar alignment with each other. The rearward adjacent link 42 is in that portion 48A of plane 48 which extends outwardly and rearwardly from upper support edge 30. Similarly, forward adjacent link 44 dwells in that portion 48B of plane 48 which extends inwardly and forwardly from the supporting edge 30. Again, this diagonal disposition of the loops 39 facilitates the entry of the stick 47 into the space 46A of each loop.

It should also be noted that the link engaging portion 33 of tang element 32 presents a passive support for the rearward adjacent link 42 which is easily disengaged from the link 42 as the loops 39 are lifted upwardly and slightly rearwardly from engagement with the support edge 30 for removal from a supporting conveyor.

Figure 10:
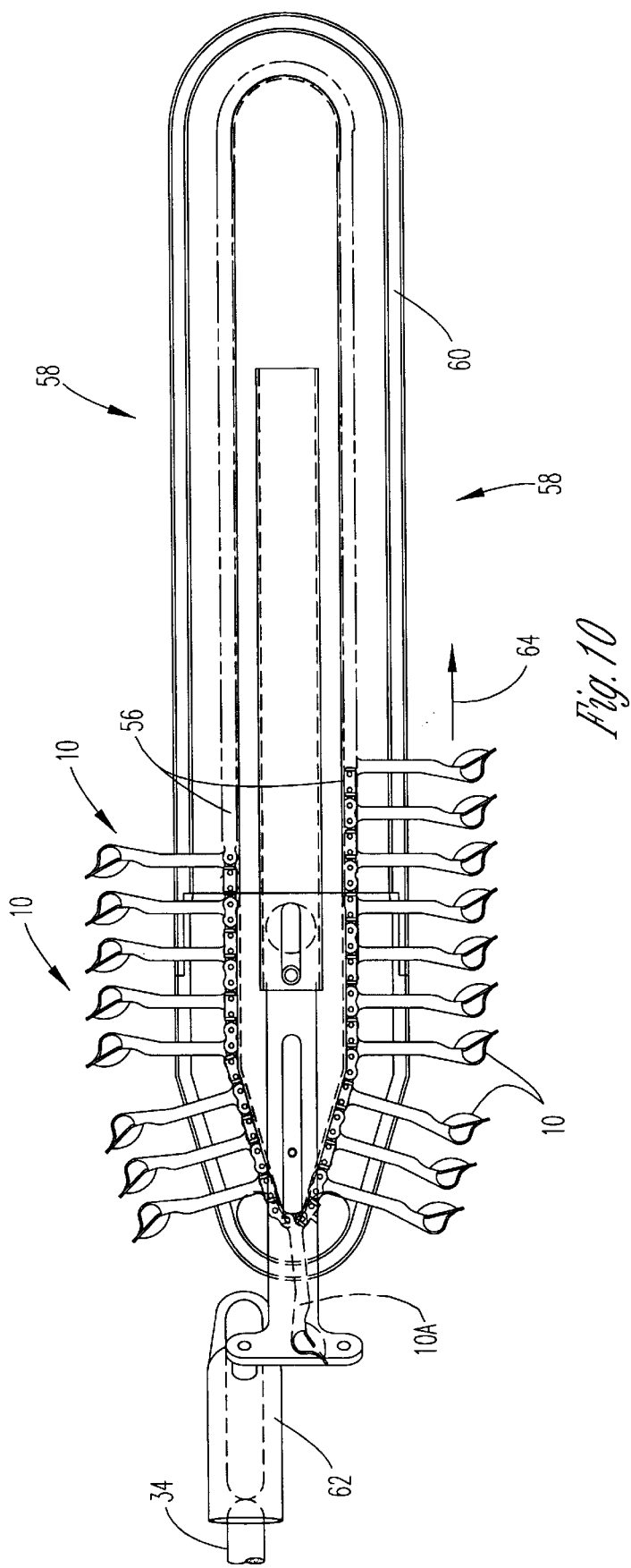
FIG. 10 is a plan view of the conveyor hooks of this invention mounted on an actual conveyor.

Each hook 30 has a connector portion 50 at the first end 14 of support arm 12. (FIGS. 3 and 4.) The connector portion 50 has an aperture 52 and a notch 54 to facilitate connection to a conventional conveyor chain 56 (FIG. 10) of conveyor 58. Conveyor chain 56 is mounted on conveyor frame 60 and the chain is operated by any convenient source of power (not shown). The linked sausage strand 34 passes longitudinally through discharge horn 62 and is picked up by the endmost hook 10A as the conveyor chain 56 and the hooks 10 move in a counterclockwise direction (FIG. 10) as indicated by the arrow 64.

It is therefore seen that this invention will achieve at least all of its stated objectives.

What is claimed is:

1. A sausage conveyor hook, comprising
an elongated support arm having first and second ends and first and second arm portions disposed at an angle with respect to each other,
the first arm portion normally being in a horizontal position and the second arm portion extending downwardly and outwardly from the first arm portion,
the support arm having forwardly and rearwardly side edges,
a head on a lower end of the second arm portion and having a blade with an upper support edge extending upwardly and forwardly from the lower end of the second arm portion,
a tang element on the head having a link engaging portion located rearwardly and below the support edge so that when a strand of linked sausages comprised of a plurality of sausage links separated by link points is draped over the support edge so that a pivotal link point is proximate to the support edge, the strand will bend on the pivotal link point proximate the support edge, and the sausage links adjacent such pivotal link point will be held in an angular position with respect to each other by the relative positions and shapes of the blade and the tang.

2. The hook of claim 1 wherein the support edge of the blade and the tang are such that the center axes of adjacent sausage links draped across the support edge will be in substantially the same vertical plane.

3. The hook of claim 2 wherein the plane in which the sausage links would dwell is diagonally disposed with respect to the forward edge of the support arm.

4. The hook of claim 3 wherein the plane extends at an angle with respect to the support edge so that the sausage links adjacent the link point will extend forwardly and inwardly, and rearwardly and outwardly, respectively, from the support edge.

5. The hook of claim 4 wherein the hook is stamped out of a single piece of flat material.

6. The hook of claim 1 wherein the blade has a forwardly extending flange to engage a link extending downwardly from the supporting edge to further enlarge the angular position of the sausage links adjacent the pivotal link point.

7. The hook of claim 1 wherein means are provided on the first end of the support arm to connect the hook to a conveyor chain.

8. The hook of claim 1 wherein a slot is located along adjacent edges of the blade and the flange to facilitate a forwardly extending bent position of the flange with respect to the blade.

9. The hook of claim 1 wherein the tang is arcuate in configuration and extends from the lower end of the second arm portion to an outer end of the blade.

10. The hook of claim 4 wherein the support arm is flat and of rectangular cross section.

* * * * *